United States Patent [19]

Hageman et al.

[11] 4,411,822
[45] Oct. 25, 1983

[54] INITIATOR SYSTEM FOR RADIATION CURABLE COMPOSITIONS, RADIATION CURABLE COMPOSITIONS CONTAINING SUCH AN INITIATOR SYSTEM, A PROCESS FOR CURING SAID COMPOSITIONS AND PRODUCTS COVERED THEREWITH

[75] Inventors: Hendrik J. Hageman, Rozendaal; Egenius A. Giezen, Rheden; Leonardus G. J. Jansen, Zevenaar, all of Netherlands

[73] Assignee: Akzo N.V., Arnhem, Netherlands

[21] Appl. No.: 246,423

[22] Filed: Mar. 23, 1981

[30] Foreign Application Priority Data

Mar. 31, 1980 [NL] Netherlands ............. 8001884

[51] Int. Cl.$^3$ .................. B01J 31/02; B01J 31/04
[52] U.S. Cl. .................. 502/168; 430/17; 430/284; 430/285; 430/286
[58] Field of Search .............. 252/426, 431 R, 431 C, 252/431 P

[56] References Cited

U.S. PATENT DOCUMENTS

| | | | |
|---|---|---|---|
| 2,448,828 | 9/1948 | Renfrew | 252/426 X |
| 2,647,080 | 7/1953 | Joyce | 252/426 X |
| 3,222,429 | 12/1965 | Boyd et al. | 252/426 X |
| 3,933,682 | 1/1976 | Bean | 252/431 R |
| 4,017,652 | 4/1977 | Gruber | 252/426 X |
| 4,077,858 | 3/1978 | Costanza et al. | 204/159.23 |
| 4,207,156 | 6/1980 | Collins et al. | 204/159.24 |

FOREIGN PATENT DOCUMENTS

906142  9/1960  United Kingdom .
536459  4/1977  U.S.S.R. .

OTHER PUBLICATIONS

Chemical Abstracts: vol. 86, 1977, p. 626, 81719s.
Encyclopedia of Chemical Technology, vol. 13, (Third Edition), pp. 367-371.

*Primary Examiner*—Patrick Garvin
*Attorney, Agent, or Firm*—Stevens, Davis, Miller & Mosher

[57] ABSTRACT

A new initiator system for radiation curable composition is disclosed.

In said system there are incorporated:
(a) a photoinitiator, with the exception of a compound of the formula:

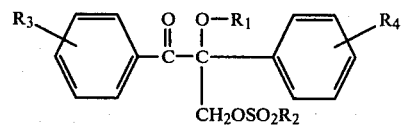

where $R_1$=H or an alkyl group, an alkenyl group, a cycloalkyl or cycloalkenyl group, an aryl group, a furfuryl group or the group

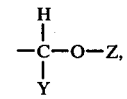

where Y represents a methyl group and Z an alkyl group or Y and Z together form a 1,3- or 1,4-alkylene group having 3 or 4 carbon atoms; $R_2$=an alkyl group or alkenyl group, a cycloalkyl group or cycloalkenyl group, an alkaryl group or a furfuryl group; $R_3$ and $R_4$ may be the same or different and represent a hydrogen, a chlorine or a bromine atom or a phenyl group, an alkyl group or alkoxy group, or a dialkyl amino group;
(b) a synergistic amount of a Na, K and/or Li-salt of an organic acid having at least 4 carbon atoms which is compatible with the curable compositions, and
(c) a solvent for component b in such an amount that the solution of salt b in the curable compositions is just about saturated or nearly saturated.

The initiator system cures rapidly and has good storage stability.

12 Claims, No Drawings

INITIATOR SYSTEM FOR RADIATION CURABLE COMPOSITIONS, RADIATION CURABLE COMPOSITIONS CONTAINING SUCH AN INITIATOR SYSTEM, A PROCESS FOR CURING SAID COMPOSITIONS AND PRODUCTS COVERED THEREWITH

The invention relates to an initiator system for radiation curable compositions, to radiation curable compositions in which such a system is incorporated, and to a process for curing compositions containing said initiator system, and to products entirely or partly covered with a composition cured by said process.

Initiator systems for curing unsaturated monomers or mixtures thereof with unsaturated prepolymers under the influence particularly of UV-radiation are generally known.

Compositions containing such systems are employed on an industrial scale in coatings and in material for recording information, more particularly relief printing plates, in which latter case use is made of photopolymerizable synthetic resins. Other uses are clear paints, varnishes, paper coatings, printing inks, wood lacquers, pigmented films and the like.

In some fields of application there is a great need for more rapidly curing systems which are not subject to yellowing, have good storage stability and are physiologically unsuspect. The present invention provides an initiator system which satisfies the above requirements. The invention consists in that in an initiator system of the type indicated above there are incorporated:

(a) a photoinitiator, with the exception of a compound of the formula:

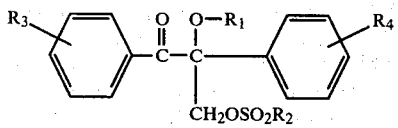

where $R_1 = H$ or a substituted or unsubstituted alkyl group having 1 to 18 carbon atoms, an alkenyl group having 2 to 18 carbon atoms, a cycloalkyl or cycloalkenyl group having 5 to 8 carbon atoms, a substituted or unsubstituted aryl group having 6 to 20 carbon atoms, a furfuryl group or the group

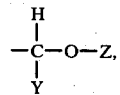

where Y represents a methyl group and Z an alkyl group having 2 to 4 carbon atoms or Y and Z together may from a 1,3- or 1,4- alkylene group having 3 or 4 carbon atoms, which is substituted or not with an alkoxy group having 1 to 4 carbon atoms; $R_2$ = a substituted or unsubstituted alkyl group or alkenyl group having 4 to 20 carbon atoms, a cycloalkyl group or cycloalkenyl group having 5 to 8 carbon atoms, an alkaryl group having 4 to 16 carbon atoms in the alkyl group or a furfuryl group; $R_3$ and $R_4$ may be the same or different and represent a hydrogen, a chlorine or a bromine atom or a phenyl group, a substituted or unsubstituted alkyl group or alkoxy group having 1 to 4 carbon atoms, or a dialkyl amino group of which the alkyl groups have 1 to 4 carbon atoms and may be substituted or not with a hydroxyl group;

(b) a synergistic amount of a Na, K and/or Li-salt of an organic acid having at least 4 carbon atoms which is compatible with the curable compositions, and (c) a solvent for component b in such an amount that the solution of salt b in the curable compositions is just about saturated or nearly saturated.

Good results are obtained if the organic acid used is a carboxylic acid, sulphonic acid, sulphinic acid, a partially esterified sulphuric or phosphoric acid, a phosphonic acid, phosphinic acid and/or an arylhydroxide.

As far as solvent c is concerned, preference is given to a solvent that has a boiling point between 40° and 150° C. Best results have been obtained with a solvent that has a boiling point between 60° and 110° C.

It has been found that generally favourable results are obtained if use is made of an initiator system which per 1 to 10 parts of compound a contains 0,1 to 2 parts of compound b.

Of the photoinitiators that are to be used in the initiator systems it is only required that they are compatible with the compositions to be initiated.

Examples of suitable photoinitiators are described in British Patent Specifications Nos. 1 379 259, 1 390 006 and 1 580 967 and U.S. Pat. Nos. 3,558,309, 3,801,329, 3,926,643, 3,933,682, 3,966,573, 3,998,712, 4,001,098 and 4,144,156. U.S. application Ser. No. 246,242, filed Mar. 23, 1981 is directed to using the photoinitiators specifically excluded from this application. Examples of photoinitiators include the benzophenone amine and thioxanthone amine systems, benzoins, benzoin ethers, benzil ketals, α-halogen ketones, α-acyloximesters, dialkoxyacetophenones, hydroxyalkylphenones, and mercaptans, aromatic disulphides, nitroso compounds, azo compounds and peroxides. Favourable results are also obtained with the use of compounds derived from α-methylol benzoin, such as compounds of the formula:

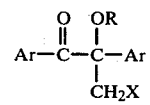

where Ar represents a substituted or unsubstituted aromatic group, R is a hydrogen atom or an organic group and X a group of the formula:

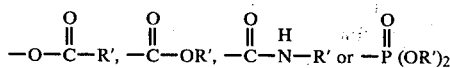

where R' also may have the meaning of a hydrogen atom or an organic group.

As examples of photoinitiators whose incorporation into an initiator system according to the present invention may lead to extraordinarily favourable results may be mentioned: α-hydroxymethylbenzoinmethane sulphonic ester, benzildimethyl ketal, benzoinbutyl and isobutyl ether, 1-(4-isopropylphenyl)-2-hydroxy-2-methyl-propane-1- on and 2-hydroxy-2-methyl-1-phenyl-propane-1-on, an equimolar mixture of 2-chlorothioxanthone+aminobenzoate ester, 4-benzoylbiphenyl +N-methyl diethanolamine (in a molar ratio of 1:2), benzophenone+N-methyl diethanolamine (in a molar ratio of 1:2), phenylglyoxylic methyl ester, 2,2-diethoxy-1-phenylethane-1-on, dibenzoyl peroxide, 1-phenyl-1,2-propanedion-2-0-benzoyloxime, 1-phenyl-1,2-propanedion-2-0-ethoxycarbonyloxime and benzoin.

The amount of solvent to be incorporated into the initiator systems according to the invention is generally 20 to 80% by weight of the components a+b+c.

The solvent may, of course, also be incorporated separately into the compositions to be cured. As a rule those solvents qualify for incorporation into the initiator system according to the invention that display some reasonable dissolving effect on component b and are compatible with the system to be cured.

Preference is given to water in view of its presenting no environmental problems. The solvent is incorporated into most resin systems in an amount of 2,5 to 6% by weight, preferably 3 to 5% by weight, together with about 1 to 10% by weight, preferably 2 to 6% by weight, of component a, calculated on the amount of composition to be cured. Of component b 0,1 to 5% by weight, and preferably 0,2 to 2% by weight is incorporated, calculated on the amount of composition to be cured.

Under some circumstances the presence of water is found to meet with insurmountable drawbacks. In such cases the invention permits employing as solvent an aliphatic alcohol. Particularly satisfactory solvents are methanol and ethanol.

Examples of salts of organic acids that may be used as compound b in the initiator systems of the present invention include, but are not limited to, potassium, sodium or lithium butyrate, valerate, 2-ethylhexanoate, laurate, stearate, versatate, caproate, sarcosate, benzoate, naphthoate, o-nitrobenzoate, adipate, dodecylbenzene sulphonate, cumene sulphonate, p-toluene sulphinate, butane sulphinate, coconut fatty alcohol sulphate, sulph(on)ated glycerol trioleate, sulph(on)ated peanut oil, lauryl sulphate, di-(2-ethylhexyl)phosphate, ethyl octylphosphonate, p-nonylphenolate, di(n-octyl)sulphosuccinate, butane sulphonate, 2-naphtholate.

Favourable results are generally obtained when compound b is the salt of an organic acid having an alkyl group containing 4 to 20 carbon atoms.

Best results are obtained with the salt of an organic acid having a straight-chain alkyl group containing 6 to 12 carbon atoms.

Very good results are obtained when use is made of lithium octane sulphonate.

Good to very good results are also obtained when compound b is a p-alkyl or p-alkoxy-benzene sulphonic acid or a salt derivative thereof having 1 to 14 carbon atoms in the alkyl group or the alkoxy group.

The initiator systems according to the present invention are particularly suitable to be employed in the photopolymerization of unsaturated compounds containing polymerizable systems.

As suitable polymerizable systems may be mentioned all compounds of which the carbon-carbon double bond are activated by, for instance, halogen atoms or carbonyl groups, carboxy groups, ester groups, amide groups, ether groups or aryl groups, and carbon-carbon double and carbon-carbon triple bonds. As examples may be mentioned: the acrylate, methacrylate, itaconate, cinnamate, or sorbate of an alkylene glycol, alkoxylene glycol, alicyclic glycol, and higher polyol such as ethylene glycol, triethylene glycol, tetraethylene glycol, tetramethylene glycol, pentanediol, trimethyloleth-ane, pentaerythritol, sorbitol, diols of unsaturated fatty acids, and the like, or modified acrylates, methacrylates, and itaconates, acrylated, methacrylated, and itaco-nated prepolymers, e.g. epoxy resins, oil and oil-free alkyd resins, urethanes and linear polyesters. Examples are hydroxyethyl acrylate, trimethylolpropane trimethacrylate, pentaerythritol triacrylate, polyethylene glycol diacrylate, polyethylene glycol dimethacrylate, pentaerythritol dimethacrylate, pentaerythritol diitaconate, ethylene glycol dimethacrylate and methacrylated epoxy resins.

Part of the unsaturated acids may be replaced with saturated acids, such as succinic acid, glutaric acid, adipic acid, phthalic acid, tetrachlorophthalic acid or trimellitic acid. Alternative modifications include building in monovalent alcohols, such as butanol, hexanol and tetrahdyrofurfuryl alcohol or monoprotic acids, such as benzoic acids, oleic acid, linseed oil fatty acid, ricinoleic acid, acrylic acid and methacrylic acid.

In addition to the initiator systems according to the invention the compositions to be cured may contain usual additives, such as tertiary amines (triethanolamine), phosphites (triphenyl phosphite, nonylphenyl phosphite), phosphines (triphenylphosphine), p-benzoquinone, hydroquinone, 3-methylpyrocatechol or copper compounds such as copper naphthenate. Optionally, polymerization catalysts, for instance peroxides in amounts of 0,1 to 4% by weight, may still be incorporated into the compositions to be cured.

In order to protect light-sensitive substances, for instance light-coloured kinds of wood, a small amount of commonly used ultraviolet light absorbing agent may be added to the moulding or coating composition without the reactivity being considerably affected.

Further photopolymerization may be carried out in the presence of usual pigment, carrier and filler, and thixotropizing agents, such as glass fibres, synthetic fibres, silicic acid and talc.

The present invention also provides a process for the radiation curing of a photopolymerizable composition, in which process one of the above-mentioned compositions containing an initiator system according to the invention is exposed to radiation in a manner known in itself.

This radiation should have a wave length generally of from 200 to 500 nm in order for the component a of the initiator system to be brought into the activated state. As source of radiation there may be used sunlight or artificial light of which the emission is in the above-mentioned range. Suitable for use are, for example, mercury vapour, xenon and tungsten lamps. Also when exposed to ultraviolet and visible radiation from energy-poor fluorescent lamps having an emission of 300–580 nm, the compositions according to the invention will rapidly cure to practically colourless objects and coatings.

The invention will be further described in, but not limited by the following examples.

EXAMPLE I

A series of photopolymerizable compositions based on tetraethylene glycol diacrylate were prepared.

Into each composition there was incorporated 3% by weight of photoinitiator (component A) together with 1% by weight of lithium octane sulphonate (component b) and 5% by weight of water (component c).

Each of the compositions was applied as clear paper lacquer in a coating thickness of 20 microns.

The composition was cured with the aid of a Philips HOK 6 highpressure mercury vapor lamp. The distance between the lamp and the coating applied to a moving belt was about 20 cm.

The maximum speed was measured at which still a tack-free coating was obtained.

The measurable speeds (m/minute) for the various compositions are given in the following table.

TABLE I

| | component c | |
|---|---|---|
| | — | 5% by wt. H$_2$O |
| Photoinitiator (3% by weight) | belt speed in m/min | |
| Benzoin | 2 | >40 |
| methane sulphonic ester of α-hydroxy-methyl benzoin | 2 | >40 |
| benzildimethyl ketal | 2 | >40 |
| n-butyl or isobutyl ether of benzoin | 2 | >40 |
| 1-(4-isopropylphenyl)-2-hydroxy-2-methylpropane-1-on | 2 | >40 |
| 2-hydroxy-2-methyl-1-phenyl-propane-1-on | 4 | >40 |
| phenylglyoxylic methyl ester | 8 | >40 |
| 2-chlorothioxanthone + amino benzoate ester (1:1) | 6 | >40 |
| 4-benzoylbiphenyl + N—methyl diethanol-amine (1:2) | 18 | >40 |
| benzophenone + N—methyl diethanolamine (1:2) | 10 | 20 |
| 2,2-diethoxy-1-phenylethane-1-on | 2 | >40 |
| dibenzoyl peroxide | 2 | >40 |
| 1-phenyl-1,2-propanedion-2-O—benzoyloxime | 2 | >40 |
| 1-phenyl-1,2-propanedion-2-O—ethoxycarbonyloxime | 4 | >40 |

EXAMPLE II

The procedure of Example I was used in such a way that as photoinitiator benzildimethyl ketal was used in a concentration of 3% by weight. Into each composition component b was incorporated in an amount of 1% by weight, in combination or not with 5% by weight of H$_2$O.

The speeds measured for the various compositions are given in the table below.

TABLE II

| | component c | |
|---|---|---|
| | — | 5% by wt H$_2$O |
| component b (1% by wt.) | belt speed in m/min | |
| lithium butane sulphonate | 4 | >40 |
| lithium octane sulphonate | 6 | >40 |
| lithium dodecane sulphonate | 6 | >40 |
| sodium octane sulphonate | 2 | >40 |
| sodium tosylate | 2 | >40 |
| potassium tosylate | 2 | >40 |
| lithium p-octyl benzene sulphonate | 2 | >40 |

EXAMPLE III

The procedure of Example II was repeated with 3% by weight of benzildimethyl ketal and varying amounts of lithium octane sulphonate and water. The speeds measured are summarized in the table below.

TABLE III

| lithium octane sulphonate wt % | wt % H$_2$O | belt speed m/min |
|---|---|---|
| 1 | 5 | >40 |
| 0,7 | 5 | >40 |
| 0,5 | 5 | >40 |
| 0,3 | 5 | >40 |
| 0,2 | 5 | >40 |
| 0,1 | 5 | 2-4 |

TABLE III-continued

| lithium octane sulphonate wt % | wt % H$_2$O | belt speed m/min |
|---|---|---|
| 0,2 | 4 | >40 |
| 0,2 | 3 | >40 |
| 0,2 | 2 | >2 |

EXAMPLE IV

A photopolymerizable composition was prepared made up of 27% by weight of an epoxy diacrylate (average molecular weight 1050) and 73% by weight of tetraethylene glycol diacrylate.

Use being made of the same procedure as described in Example I, a coating was applied to a substrate and subsequently exposed to radiation.

The speeds measured for the various compositions are given in the table below.

TABLE IV

| | | component c | |
|---|---|---|---|
| | | — | 5% by wt H$_2$O |
| photoinitiator (3% by wt) | component b (1% by wt) | belt speed in m/min | |
| benzildimethyl ketal |  | 10 | 34 |
| benzildimethyl ketal | C$_8$H$_{17}$SO$_3^-$Li$^+$ | 10 | >40 |

EXAMPLE V

The procedure of Example I was repeated with 3% by weight of benzildimethyl ketal as photoinitiator, 1% by weight of lithium butane sulphonate (component b), and 5% by weight of methanol, 5% by weight of ethanol and 10% by weight of allyl alcohol, respectively. The speed measured for the three compositions was over 40 m/minute.

EXAMPLE VI

The procedure of Example IV was repeated in such a way that for component b there were used various salts of carboxylic acids. Component c was water in a concentration of 5% by weight. The salt concentration was 1% by weight. The results are given in the table below.

TABLE V

| component b | belt speed in m/minute |
|---|---|
| sodium stearate | >60 |
| lithium laurate | >60 |
| lithium caproate | >60 |
| lithium valerate | >60 |
| lithium butyrate | ≈30 |

EXAMPLE VII

The procedure of Example IV was repeated in the presence of 5% by weight of water and two sulphate salts in a concentration of 1 or 2% by weight. The results are given in the table below.

TABLE VI

| component b | concentration (b) | belt speed in m/min |
|---|---|---|
| sodium coconut fatty | | |

TABLE VI-continued

| component b | concentration (b) | belt speed in m/min |
|---|---|---|
| alcohol sulphate | 2% | >60 |
| sodium lauryl sulphate | 1% | >60 |

We claim:

1. An initiator system for radiation curable compositions said initiator system comprising:
   (a) a photoinitiator, with the exception of a compound of the formula:

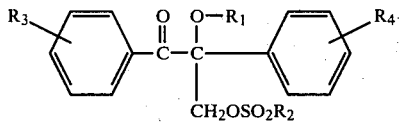

where $R_1$ = H or a substituted or unsubstituted alkyl group having 1 to 18 carbon atoms, an alkenyl group having 2 to 18 carbon atoms, a cycloalkyl or cycloalkenyl group having 5 to 8 carbon atoms, a substituted or unsubstituted aryl group having 6 to 20 carbon atoms, a furfuryl group or the group

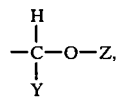

where Y represents a methyl group and Z an alkyl group having 2 to 4 carbon atoms or Y and Z together form a 1,3- or 1,4- alkylene group having 3 or 4 carbon atoms, which is substituted or not with an alkoxy group having 1 to 4 carbon atoms; $R_2$ = a substituted or unsubstituted alkyl group or alkenyl group having 4 to 20 carbon atoms, a cycloalkyl group or cycloalkenyl group having 5 to 8 carbon atoms, an alkaryl group having 4 to 16 carbon atoms in the alkyl group or a furfuryl group; $R_3$ and $R_4$ may be the same or different and represent a hydrogen, a chlorine or a bromine atom or a phenyl group, a substituted or unsubstituted alkyl group or alkoxy group having 1 to 4 carbon atoms, or a dialkyl amino group of which the alkyl groups have 1 to 4 carbon atoms and may be substituted or not with a hydroxyl group;
   (b) a synergistic amount of a Na, K and/or Li-salt of an organic acid having at least 4 carbon atoms which is compatible with the curable compositions, and
   (c) a solvent for component b in such an amount that the solution of salt b in the curable compositions is just about saturated or nearly saturated.

2. An initiator system according to claim 1, characterized in that the acid is at least one of a carboxylic acid, sulphonic acid, sulphinic acid, a partially esterified sulphuric or phosphoric acid, a phosphonic acid, phosphinic acid, and an arylhydroxide.

3. An initiator system according to claim 1 or 2, characterized in that the solvent c has a boiling point between 40° and 150° C.

4. An initiator system according to claim 3, characterized in that the solvent c has a boiling point between 60° and 110° C.

5. An initiator system according to claim 1, characterized in that per 1 to 10 parts of compound a it contains 0,1 to 2 parts of compound b.

6. An initiator system according to claim 1, characterized in that the amount of solvent is 20 to 80% by weight of the components a+b+c.

7. An initiator system according to claim 1, characterized in that the solvent used is water.

8. An initiator system according to claim 1, characterized in that the solvent is an aliphatic alcohol.

9. An initiator system according to claim 8, characterized in that the aliphatic alcohol is methanol.

10. An initiator system according to claim 8, characterized in that the aliphatic alcohol is ethanol.

11. An initiator system according to claim 1, characterized in that compound b is the salt of an organic acid having an alkyl group containing 4 to 20 carbon atoms.

12. An initiator system according to claim 11, characterized in that compound b is the salt of an organic acid having a straight chain alkyl group containing 6 to 12 carbon atoms.

* * * * *